(12) United States Patent
Rucks

(10) Patent No.: US 7,857,287 B2
(45) Date of Patent: Dec. 28, 2010

(54) LIFTING DEVICE

(76) Inventor: Willard E. Rucks, P.O. Box 16431, Missoula, MT (US) 59808-6431

( * ) Notice: Subject to any disclaimer, the term of this patent is extended or adjusted under 35 U.S.C. 154(b) by 945 days.

(21) Appl. No.: 11/674,182

(22) Filed: Feb. 13, 2007

(65) Prior Publication Data

US 2008/0191183 A1    Aug. 14, 2008

(51) Int. Cl.
B66F 3/36    (2006.01)
(52) U.S. Cl. .................. 254/100; 245/418; 245/134; 245/424
(58) Field of Classification Search ............... 254/100, 254/418–425, 133 R, 134
See application file for complete search history.

(56) References Cited

U.S. PATENT DOCUMENTS

| 3,850,409 | A | * | 11/1974 | Davis et al. ............... 254/89 H |
| 3,946,988 | A | * | 3/1976 | Kehren ..................... 254/30 |
| 4,238,113 | A | * | 12/1980 | Adams ...................... 254/425 |
| 4,629,163 | A | * | 12/1986 | Miller et al. ............. 254/133 R |
| 4,796,864 | A | * | 1/1989 | Wilson ..................... 254/425 |
| 5,713,559 | A | * | 2/1998 | McClarin et al. ........... 254/124 |
| 6,062,545 | A | * | 5/2000 | Peavler .................... 254/418 |
| 6,361,023 | B1 | * | 3/2002 | Peavler .................... 254/424 |
| 7,722,011 | B1 | * | 5/2010 | Edwards ................... 254/133 R |
| 2003/0222426 | A1 | | 12/2003 | Rosenlund |
| 2008/0191183 | A1 | * | 8/2008 | Rucks ...................... 254/424 |

* cited by examiner

Primary Examiner—Lee D Wilson
(74) Attorney, Agent, or Firm—Dale J. Ream

(57) ABSTRACT

A lifting device includes a jack having a first portion and a second portion movable relative to the first portion. A coupling is fixedly attached to the second portion for movement relative to the first portion, the coupling extending away from the second portion and having a configuration for selective attachment to a receiver hitch. The second portion may be moved relative to the first portion with a handle. The lifting device includes a sleeve coupled to the coupling for movement with the sleeve. Support tubing may extend through the sleeve for contact with the ground. This tubing may be locked into place relative to the sleeve. With the tubing, sleeve, and coupling locked into place, a vehicle will be upheld if the jack portions fail. The lifting device may also include a bumper attachment for raising a vehicle that does not have a receiver hitch.

3 Claims, 4 Drawing Sheets

LIFTING DEVICE

BACKGROUND OF THE INVENTION

This invention relates generally to lifting devices and, more particularly, to a lifting device that attaches to the front or rear of a vehicle for lifting the front or rear wheels off the ground.

When needing to change a tire, install tire chains, or needing to work on the underside of the vehicle, it is sometimes difficult to find a good place along the side of the vehicle to position a jack. Another problem with vehicle jacks is that they are sometimes insecure due to uneven ground, lack of a stable position beneath the vehicle frame, or jack product failure.

Various devices have been proposed for a vehicle jack used in cooperation with a vehicle receiver hitch. While the existing devices and proposals are assumably effective for their intended uses, the existing devices do not enable a user to effectively and safely raise either end of a vehicle or to secure the jack in a raised position in case the jack itself fails.

Therefore, it would be desirable to have a lifting device that enables a user to lift the front or rear wheels of a vehicle. Further, it would be desirable to have a lifting device that provides additional safety to a user by holding a vehicle in a raised position even if the jack itself fails to hold. In addition, it would be desirable to have a lifting device that is compact and easy to store.

SUMMARY OF THE INVENTION

A vehicle lifting device according to the present invention includes a jack having first and second portion with the second portion being movable relative to the first portion. The lifting device also includes a coupling fixedly attach to the second portion for movement relative to the first portion, the coupling extending away from the second position and having a configuration complementary to a configuration of a vehicle receiver hitch for selective attachment thereto. The jack includes a handle for moving the jack second portion relative to the first portion, whereby to raise a vehicle.

The vehicle lifting-device includes a sleeve operatively coupled to the coupling so that movement of the coupling causes corresponding movement of the sleeve. Support tubing may extend through the sleeve and be positioned for contact with a ground surface. This tubing may then be locked into place relative to the sleeve and so as to also lock the coupling in place. With the tubing, sleeve, and coupling locked into place, a vehicle will still be held in a raised configuration even if the jack and its first and second portions fail and would otherwise allow the vehicle to suddenly be lowered.

The vehicle lifting-device may also include a bumper attachment having a configuration complementary to a configuration of a vehicle receiver hitch for selective attachment to the coupling. The bumper attachment also includes a hook for selective attachment to a vehicle bumper. Then, the jack may be moved to an extended configuration in order to raise the vehicle.

Therefore, a general object of the present invention is to provide a lifting device for efficiently and effectively lifting the wheels of a vehicle off of the ground.

Another object of this invention is to provide a lifting device, as aforesaid, that is configured for use with a vehicle receiver hitch.

Still another object of this invention is to provide a lifting device, as aforesaid, having a sleeve with adjustable tubing that can be locked into place to hold a vehicle in a raised position even if the jack fails.

Yet another object of this invention is to provide a lifting device, as aforesaid, having a base for enhancing the stability of a jack upon a ground surface.

A further object of this invention is to provide a lifting device, as aforesaid, that is easy to use and convenient to store.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A lifting device 100 according to the present invention will now be described in detail with reference to FIGS. 1 through 4 of the accompanying drawings. More particularly, a lifting device 100 (also referred to herein as a vehicle-lifting device) according to the current invention includes a jack 110 and a coupling 120.

Figure 3:
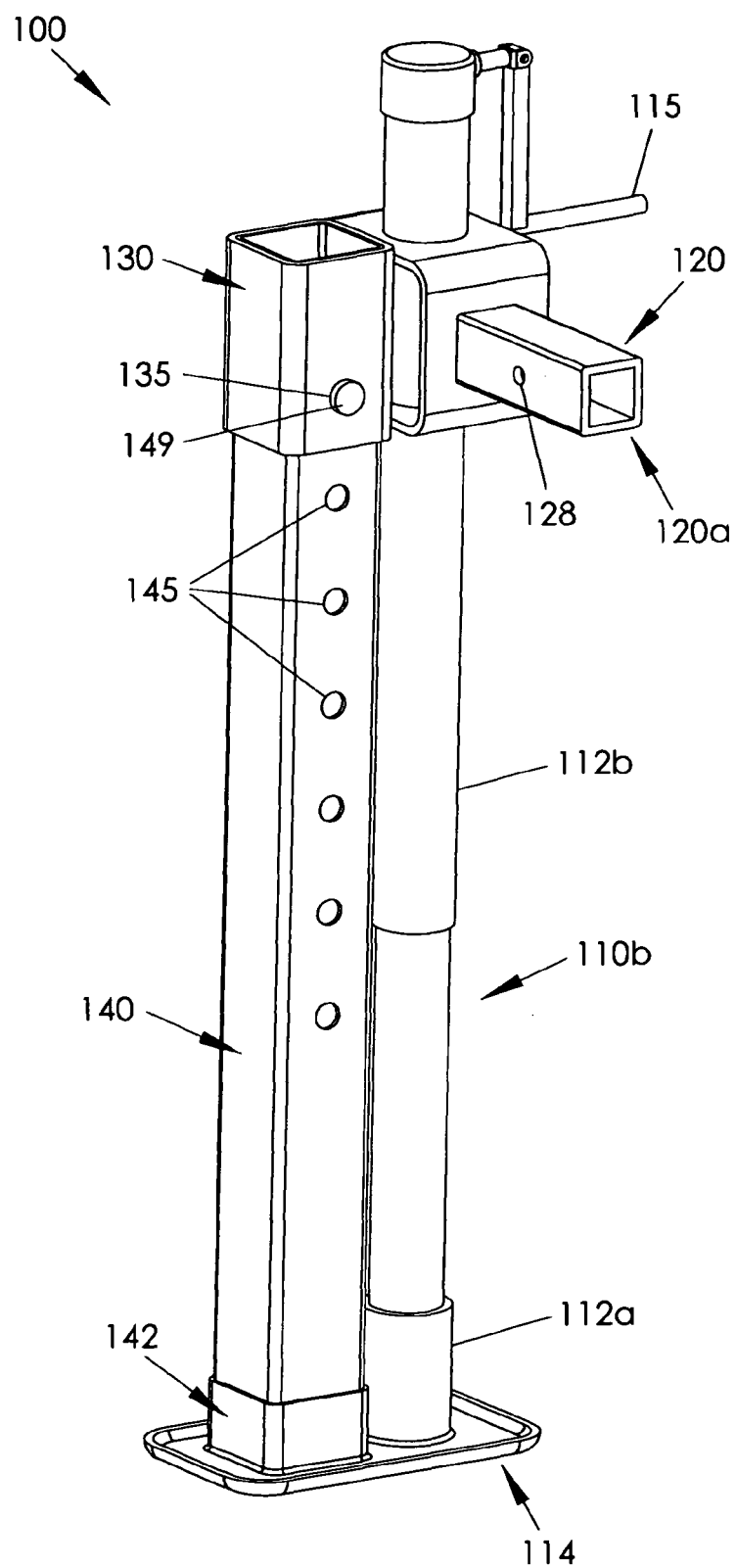
FIG. 3 is another perspective view of the lifting device as in FIG. 1 with a second portion of the jack in a raised configuration.

The jack 110 may be, for example, a screw jack movable between a retracted configuration 110a (FIG. 2) and an extended configuration 110b (FIG. 3). More particularly, the jack 110 may have first and second portions 112a, 112b (FIGS. 1 through 4). The first portion 112a (also referred to herein as a lower end of the jack 110) may be coupled to a base 114, and the second portion 112b may be movable relative to the first portion 112a. Means for moving the second portion 112b relative to the first portion 112a may be included, such as a handle 115 and appropriate gearing (not shown).

The coupling 120 is fixedly attached to the second portion 112b of the jack 110 for movement relative to the first portion 112a. The coupling 120 extends away from the jack second portion 112b and has a configuration 120a (FIGS. 2 through 4) complementary to a configuration of a vehicle receiver hitch so that the coupling 120 may be selectively attached to a vehicle receiver hitch.

A sleeve 130 may be operatively coupled to the coupling 120 (the sleeve 130 may be fixedly attached to the coupling 120 or the jack second portion 112b) so that movement of the coupling 120 (which is the same as movement of the jack second portion 112b) causes corresponding movement of the sleeve 130. Support tubing 140 may extend adjacent the sleeve 130 and have a lower end 142 for placement against a ground surface. As shown throughout the drawings, the lower end 142 may be coupled to the base 114, and/or the support tubing 140 may extend through the sleeve 130. Means may be included for selectively attaching the sleeve 130 to the support tubing 140 to lock the coupling 120 at a height to provide safety in case the jack 110 fails. More particularly, the support tubing 140 may define a plurality of holes 145, the sleeve 130 may define a hole 135, and a pin 149 may selectively pass through a respective support tubing hole 145 and the sleeve hole 135 to lock the coupling 120 at a selected height.

Figure 1:
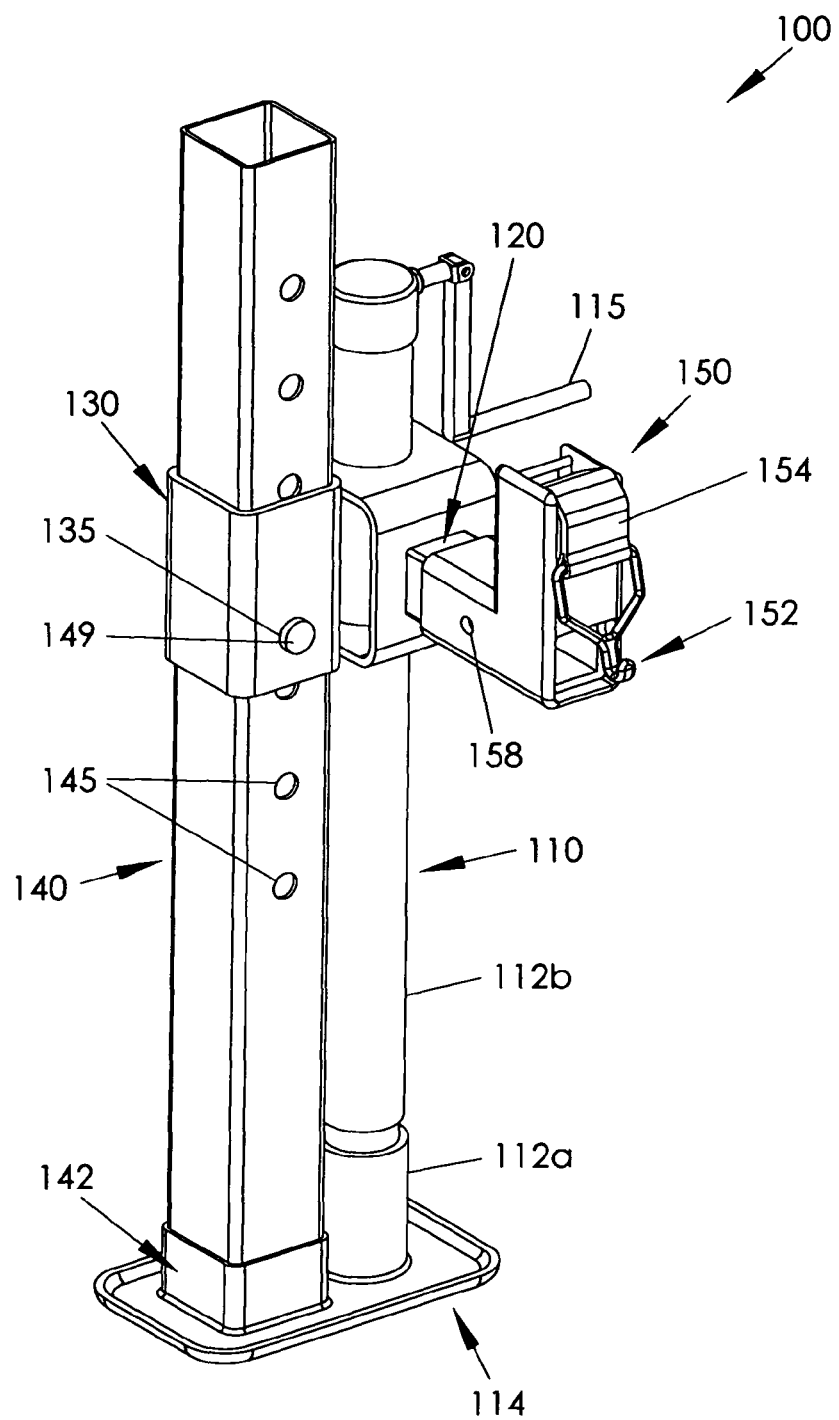
FIG. 1 is a perspective view of a lifting device according to a preferred embodiment of the present invention.
Figure 2:
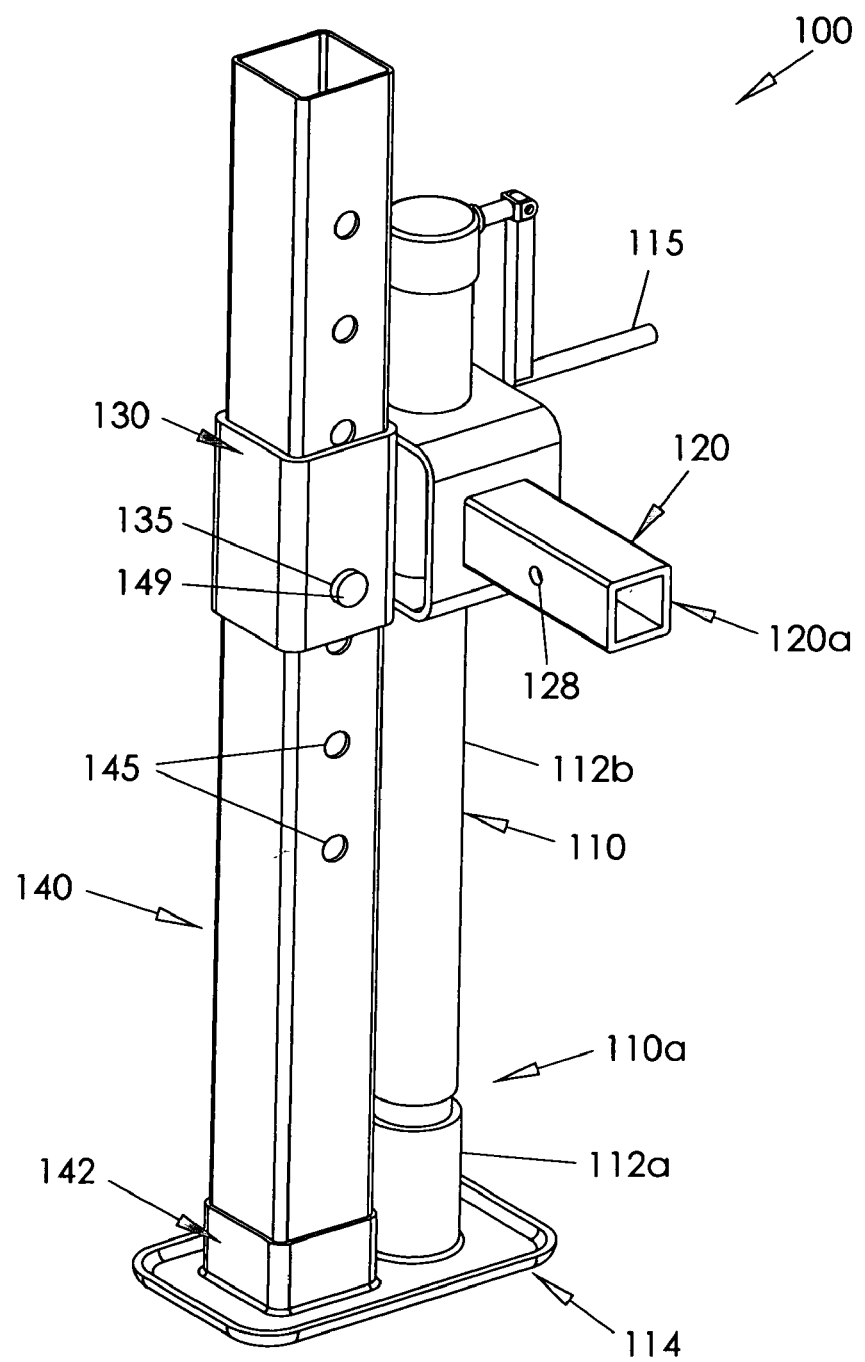
FIG. 2 is another perspective view of the lifting device as in FIG. 1 with a bumper attachment removed from the jack and coupling.
Figure 4:
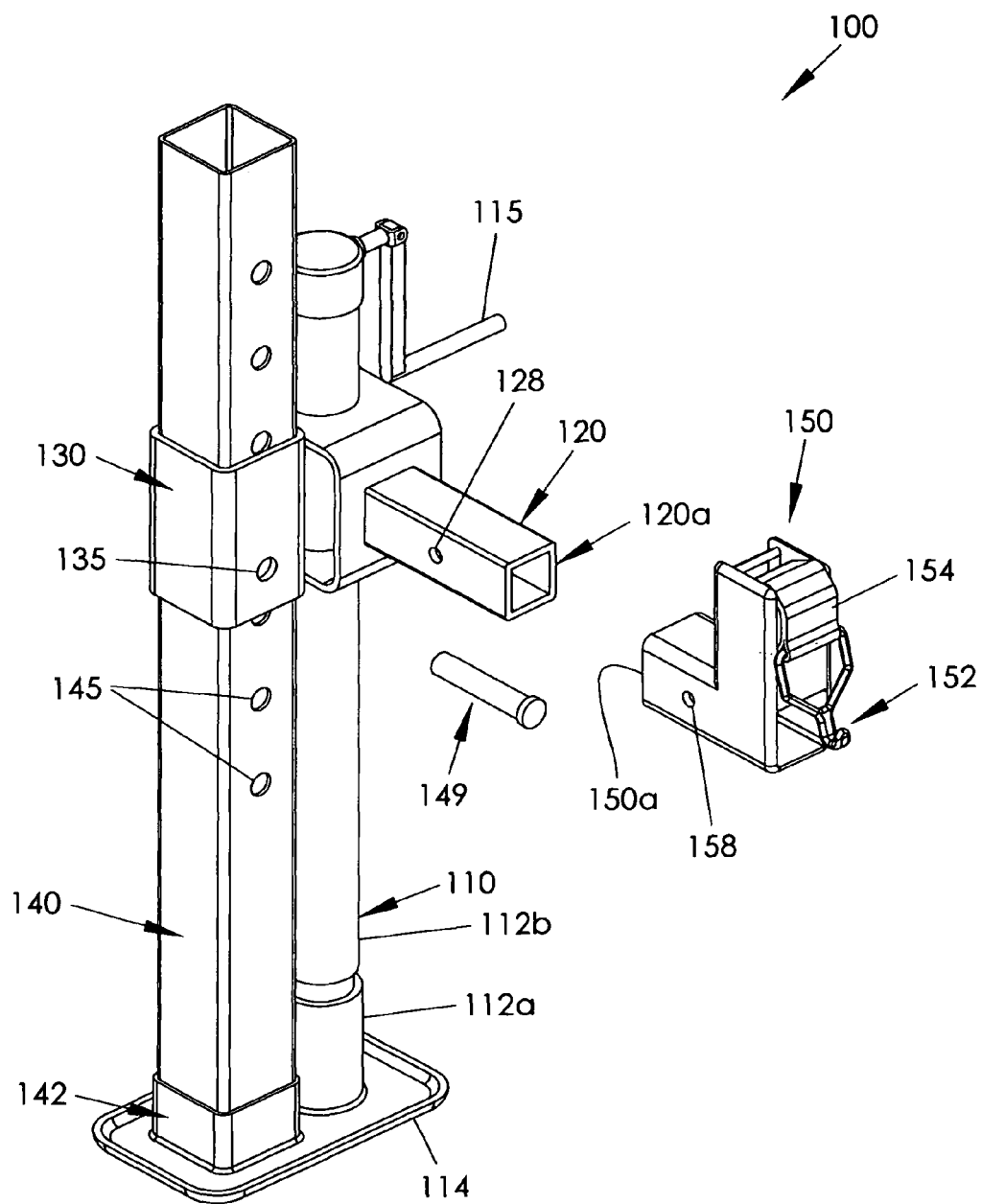
FIG. 4 is an exploded view of the lifting device as in FIG. 1.

As shown in FIGS. 1 and 4, a bumper attachment 150 may be included for selective attachment to the coupling 120. More particularly, the bumper attachment 150 may have a configuration 150a complementary to the configuration 120a of the coupling 120 for selective attachment to the coupling 120. The bumper attachment 150 may include a hook 152 for selective attachment to a vehicle bumper. The hook 152 may or may not be movable. As shown in FIG. 1, a strap or chain 154 may be coupled to the hook 152 to provide mobility (flexibility). Means may be included for selectively locking the bumper attachment 150 to the coupling 120. For example, the coupling 120 may include a hole 128 (FIG. 2), the bumper attachment 150 may include a corresponding hole 158 (FIG. 1), and a pin (not shown) may pass through the holes 128, 158 to lock the bumper attachment 150 to the coupling 120.

In use, the lifting device 100 may be placed adjacent a vehicle. The coupling 120 may be inserted in a vehicle receiver hitch and coupled thereto by a pin (not shown). The first portion 112a of the jack 110 may rest on the ground (such as through base 114), and the second portion 112b may be moved away from the first portion 112a (e.g., by cranking the handle 115). By moving the second portion 112b away from the first portion 112a, the coupling 120 is raised, and the vehicle may be lifted off the ground. Once a desired height is reached, the pin 149 may pass through a respective support tubing hole 145 and the sleeve hole 135 to lock the coupling 120 at the selected height. If the jack 110 were to fail while the coupling 120 is locked at the selected height, the sleeve 130, tubing 140, and pin 149 may nonetheless keep the coupling 120 from lowering. To lower the vehicle, the pin 149 may be removed and the handle 115 may be used to move the jack second portion 112 toward the jack first portion 112a. The coupling 120 may then be separated from the vehicle receiver hitch.

If the vehicle does not have a receiver hitch or if the front of the vehicle needs to be raised, the bumper attachment 150 may be used. More particularly, the bumper attachment 150 may be attached to the coupling 120 as described above, and the hook 152 may be fastened to the vehicle's bumper. The jack second portion 112b may then be adjusted relative to the first portion 112a as described above to raise and lower the vehicle.

It is understood that while certain forms of this invention have been illustrated and described, it is not limited thereto except insofar as such limitations are included in the following claims and allowable functional equivalents thereof.

The invention claimed is:

1. A vehicle-lifting device, comprising:
   a base;
   a jack having first and second portions, said first portion being coupled to said base, said second portion being movable relative to said first portion;
   a coupling fixedly attached to said second portion for movement relative to said first portion, said coupling extending away from said second portion and having a configuration complementary to a configuration of a vehicle receiver hitch for selective attachment thereto;
   means for moving said second portion relative to said first portion;
   a bumper attachment having:
      a configuration complementary to a configuration of said coupling for selective attachment thereto;
      a hook for selective attachment to a vehicle bumper;
   a sleeve operatively coupled to said jack second portion, whereby movement of said second portion causes corresponding movement of said sleeve;
   support tubing extending adjacent said sleeve and having a lower end coupled to said base;
   wherein:
      said support tubing defines a plurality of holes;
      said sleeve defines a hole; and
      a pin selectively passes through a respective hole in said support tubing and said sleeve hole to operatively lock said coupling at a height to provide safety in case said jack fails.

2. The vehicle-lifting device of claim 1, wherein said bumper attachment hook is coupled to a strap.

3. The vehicle-lifting device of claim 1, further comprising:
   means for selectively locking said bumper attachment to said coupling; and
   means for selectively attaching said sleeve to said support tubing to operatively lock said coupling at a height to provide safety in case said jack fails.

* * * * *